United States Patent [19]

Propster et al.

[11] Patent Number: 4,462,815
[45] Date of Patent: Jul. 31, 1984

[54] SCRAP GLASS RECOVERY

[75] Inventors: Mark A. Propster, Gahanna; William L. Streicher, Granville, both of Ohio

[73] Assignee: Owens-Corning Fiberglas Corporation, Toledo, Ohio

[21] Appl. No.: 451,115

[22] Filed: Dec. 20, 1982

[51] Int. Cl.³ .............................................. C03B 5/16
[52] U.S. Cl. .......................................... 65/2; 65/23; 65/27; 65/134; 134/2; 134/38
[58] Field of Search ................ 134/38, 25.1, 2; 65/2, 65/23, 27, 134

[56] References Cited

U.S. PATENT DOCUMENTS

| 3,250,643 | 5/1966 | Sergent | 134/38 X |
| 3,686,034 | 8/1972 | Rothschild | 134/2 |
| 3,847,664 | 11/1974 | Gravel | 134/2 |
| 4,129,136 | 12/1978 | Kapoor | 134/38 X |
| 4,145,202 | 3/1979 | Grodin et al. | 65/2 |
| 4,292,064 | 9/1981 | Propster | 65/27 |
| 4,374,660 | 2/1983 | Sakhuja et al. | 65/27 X |
| 4,397,692 | 8/1983 | Ramge et al. | 134/2 |

Primary Examiner—Robert L. Lindsay, Jr.
Attorney, Agent, or Firm—Ronald C. Hudgens; Patrick P. Pacella; Philip R. Cloutier

[57] ABSTRACT

A method of removing coatings from glass fibers in which the fibers are introduced into a bed fluidized by a gas at elevated temperatures, the gas converting the coatings to substances which leave the bed with the gases.

10 Claims, 1 Drawing Figure

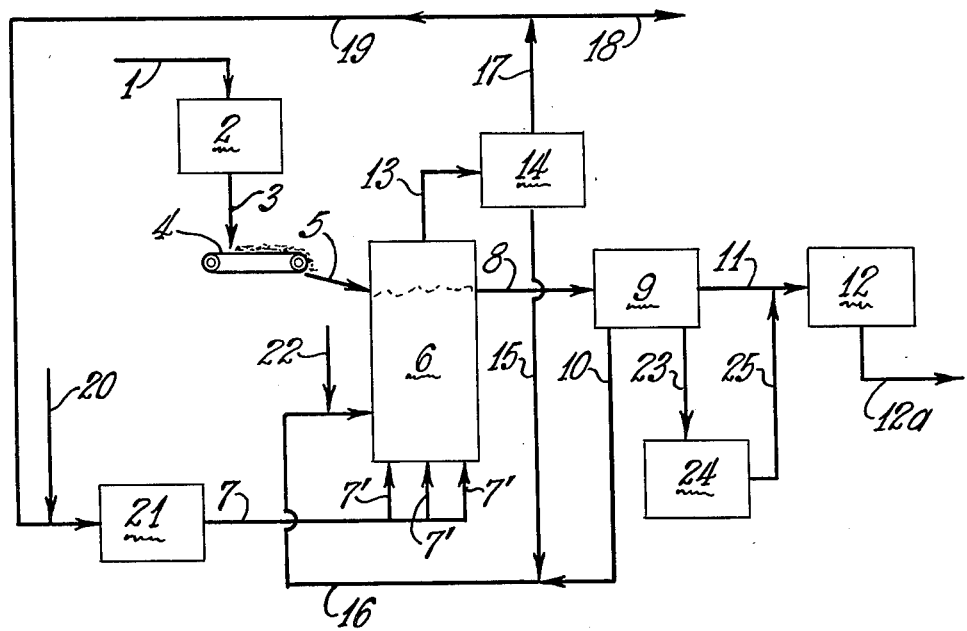

SCRAP GLASS RECOVERY

TECHNICAL FIELD

This invention relates to scrap glass recovery.

In one of its more specific aspects, this invention relates to the recovery of scrap glass employing a fluidized bed.

BACKGROUND OF THE INVENTION

In the production of glass fiber products such as insulation, duct board, reinforcement fibers, and the like, there is produced a considerable amount of waste or scrap glass. Much of the scrap glass cannot be reintroduced directly into the melting furnace because the glass, immediately upon formation, has applied to its surface one or more surface coatings such as sizes or binders. As a result mere reintroduction into the furnace, without pretreatment, results in glass batch contamination. Accordingly, it has been the general practice to discard scrap glass with attendant energy and material losses, disposal problems, and the like.

There now has been developed a scrap glass recovery process directed to the removal of such surface coatings to the extent that direct introduction of the cleaned glass scrap into the melting furnace is practical.

STATEMENT OF THE INVENTION

According to this invention there is provided a method of removing coatings from glass fibers which comprises contacting the glass fibers in a fluidized bed with a gas at elevated temperatures to remove at least a portion of said coatings from the scrap glass and to produced cleaned fibers.

By cleaned fibers is meant fibers having a weight loss on ignition (L.O.I.) less than those introduced into the fluidized bed.

In one embodiment of this invention, the scrap glass is contacted with an oxygen-containing gas to convert the coatings to oxidation products and so remove the coatings from the fibers.

In another embodiment of this invention, the scrap glass is contacted with a gas at a temperature sufficient to crack the coatings to lower molecular weight substances which are swept from the fluidized bed.

DESCRIPTION OF THE DRAWING

The drawing depicts one embodiment of the method of this invention.

DESCRIPTION OF THE INVENTION

The method of this invention can be used to remove any coating from any glass fibers. It is only necessary that such coatings be capable of being converted to substances which can be swept from the bed by the gas introduced into the bed. Such coatings include sizes which are conventionally applied to glass fibers used in producing textiles, glass reinforcements products and the like. Such coatings also included binders which are conventionally applied to glass fibers used in producing insulation, ceiling panels, duct board, and the like.

The method of this invention is applicable to such materials regardless of the amount of such coatings on the surface of the fibers or of the nature of the glass fibers or glass fiber products. For example, the invention has been employed successfully using heavy density (5-8 #/cu. ft.) fiber board having a L.O.I. of 15 percent ground in size to less than 1 inch.

The fluidized bed can be of any suitable dimensions and employ any suitable material as the fluidizing media in the bed. Because some portion of the fluidized media in the bed will tend to adhere to the glass recovered from the process, a preferred bed material will comprise that composition of glass batch into which the recovered scrap glass is introduced upon recovery. However, the fluidized bed media can comprise glass pellets, silica particles, aluminum oxide and any other substances capable of being fluidized under the velocity of gas passage through the bed at the required operating temperature. In addition, the bed can contain catalysts which facilitate the removal of the coatings from the glass.

The scrap glass can be introduced into the bed in any suitable size. Preferably, the glass will be reduced in any suitable manner to a size which allows separation of the recovered glass from the particles of the bed. For example, scrap has been found satisfactory when reduced in size to discrete $\frac{1}{4}$" to 2" particles which do not reagglomerate upon contact.

The method of this invention can be conducted at any suitable temperature to convert the coating on the glass to removable substances while maintaining the bed temperature below its sintering temperature. Preferably, the bed will be maintained at a temperature within the range of from about 900° F. to about 1300° F. This temperature can be maintained by either heating the fluidizing gases or by heating the bed by extraneous means, or both.

The method of this invention can be conducted under any suitable pressure. Preferably, it will be conducted under atmospheric pressure.

The method of the invention can be conducted under any suitable conditions of gaseous throughout. While air is the preferred gaseous fluid, other gases including nitrogen, carbon dioxide, oxygen and steam, and combinations thereof, can be employed. Such gases will be passed through the bed at velocities sufficient to fluidize the bed, these velocities being between about 110 to about 220 feet per minute. If air is employed, it should be introduced at such a rate, in relation to coated glass imput, that the oxygen content of the gases leaving the bed is about 15 volume percent, which is sufficient to oxidize all the binder.

The process can be conducted either batch-wise or continuously. In either method, a residence time of the glass within the bed of from about 1 to about 2 minutes is sufficient under the foregoing conditions to reduce the L.O.I. of the recovered glass to about 1% or less. The amount of glass scrap within the bed should be maintained at from about 2 to about 10 weight percent to obtain good fluidization characteristics.

The scrap glass can be introduced into the bed at any suitable point and at any suitable temperature. Preferably the glass will be introduced into the top of the bed at an elevated temperature.

Referring now to the drawing which illustrates a preferred method of carrying out the invention, there is shown conduit 1 through which scrap glass is introduced into size reducer 2 wherein the scrap is reduced in size. The scrap is fed through conduit 3 onto conveyor 4 from which the glass is fed at a metered rate through conduit 5 into bed 6 containing sand therein. Hot air is introduced through conduit 7 and into the bed through one or more conduits 7' to fluidize the bed.

Some portion of sand and glass from which a principal portion of the coating has been removed is withdrawn from the fluidized bed through conduit 8 and introduced into size separator 9 in which the sand is separated from the recovered glass. The sand is withdrawn from the size separator through conduit 10. The recovered glass can be routed through conduit 11 to a batch plant where it can be mixed with glass batch ingredient and feed into furnace 12 in which it is melted to produce glass fibers through conduit 13.

The gases rising from the fluidized bed, with some sand and possibly scrap fibers entrained, are routed through conduit 13 to a separator 14 in which the sand is separated from the hot gases, the sand being routed through conduit 15 and combined in conduit 16 with that sand being routed through conduit 10. The combination is routed through line 16 into bed 6.

The hot gases separated in separator 14 are routed from the separator through conduit 17 and vented from the system through conduit 18 or recycled through conduit 19 where they are combined with fresh gases introduced through conduit 20. The combined gases are burned with natural gas in combustion chamber 21 and introduced into the fluidized bed through conduit 7 as described. The system can operate with just natural gas and air in the combustion chamber 21. Fresh sand is introduced into the system at any suitable point, for example, through conduit 22. If desired, the glass recovered from separator 9 can be routed through conduit 23 to size reducer 24 wherein it can be reduced in size and from which, through conduit 25, it can be introduced into a batch plant and then into the furnace.

The method of this invention is described in the following examples.

EXAMPLE I

Duct board having about 16 percent L.O.I. was introduced in a series of tests into an 8" diameter fluid bed, the ductboard having been reduced in size into discrete $\frac{1}{4}$" to $\frac{1}{2}$" nodules. The silica bed was held at 1100° to 1200° F., the scrap being introduced at a rate of about 2 weight percent of the weight of the bed and maintained therein about for 1 minute. Air was used as the fluidizing gas.

Results were as follows:

TABLE I

| | FLUID BED PROCESS PARAMETERS | | | | |
|---|---|---|---|---|---|
| Test No. | Type Of Scrap | Type Of Grinding | Weight Percent Scrap | Fluid Bed Temp (°F.) | Dwell Time (Min.) |
| 1 | Duct Board (16% LOI) | $\frac{1}{4}$" Screen Hammermill | 2 | 1100 | 1 |
| 2 | Duct Board (16% LOI) | $\frac{1}{4}$" Screen Hammermill | 2 | 1200 | 1 |
| 3 | Duct Board (16% LOI) | $\frac{1}{4}$" Screen Hammermill | 2 | 1300 | 1 |
| 4 | Duct Board (16% LOI) | $\frac{1}{4}$" Screen Hammermill | 2 | 1150 | 1 |
| 5 | Duct Board (16% LOI) | $\frac{1}{4}$" Screen Hammermill | 1 | 1100 | 1 |
| 6 | Duct Board (16% LOI) | $1\frac{1}{4}$" Screen Hammermill | 2 | 1150 | 1 |
| 7 | Duct Board (16% LOI) | $1\frac{1}{4}$" Screen Hammermill | 2 | 1100 | 1 |
| 8 | Duct Board (16% LOI) | $1\frac{1}{4}$" Screen Hammermill | 1 | 1070 | 1 |
| 9 | Duct Board (16% LOI) | Cumberland Mill | 2 | 1150 | 1 |

In all instances, removal of the coating was sufficient to reduce the L.O.I. of the scrap glass so that up to 50% cleaned scrap could be mixed with glass batch and produce an acceptable product. In all instances, small particles of the silica became incorporated in the glass nodules recovered.

EXAMPLE II

An 18 inch diameter fluid bed was operated at 30, 60 and 90 pounds per hour scrap feed rates. The scrap was $1\frac{1}{4}$" hammermill screened ductboard having a 15% L.O.I. The bed was operated between 1030° and 1120° F. The bed was sand and the fluidizing gas was air from a burner consuming about 250 SCFH natural gas. The bed was 8 inches in fluidized depth and was comprised of sand of 500 to 900 micron size particles. The static pressure across the bed was 11 to 14 inches water column with a fluidization gas velocity in the range of 110 feet per minute.

Operating conditions were as follows:

TABLE II

| Run No. | Scrap Size | Scrap Rate | Fluid Bed Temp. Of | % Scrap in Bed, | Avg. Dwell Time, Min. | Nat. Gas (SCFH) | % O$_2$ in Exhaust | Sand Flow #1/Hr. | Product L.O.I. |
|---|---|---|---|---|---|---|---|---|---|
| 1 | $1\frac{1}{4}$" | 30 | 1030–1060 | 3.0 | 4 | 250 | 16 | 600 | 0.3 |
| 2 | $1\frac{1}{4}$" | 60 | 1080–1120 | 5.0 | 4 | 235 | 15–16 | 600 | 0.27 |
| 3 | 1" | 60 | 1060–1090 | — | — | 255 | 16 | 600 | 0.23 |
| 4 | $\frac{1}{2}$" | 60 | 1090 | — | — | 255 | 16 | 600 | 0.17 |
| 5 | 1" | 90 | 1090–1110 | 4.0 | 2.0 | 270 | 15 | 780 | 0.35 |

In the above data, the percent scrap in the bed is the weight percent of scrap relative to the total weight of sand and scrap. The sand flow in pounds per hour is the amount of sand per introduced into the system.

It will be seen from the above data that, with the reduction of the scrap glass from an original LOI of 15% to a maximum LOI of 0.50, the process described adequately removed the coating from the scrap glass to permit the recovered glass to be introduced into the furnace after, optionally, grinding, without adversely affecting the quality of the glass fibers produced from the furnace.

It will be evident from the foregoing that various modifications can be made to the method of this invention. Such, however, are considered as being within the scope of the invention.

We claim:

1. A method of removing a coating from scrap glass fibers which comprises:
   (a) reducing the size of the scrap glass fibers to particles having a length of ¼ inch to 2 inches;
   (b) introducing the particles into a fluidized bed comprising sand suitable for use in producing glass fibers;
   (c) introducing a hot oxidizing gas upwardly into said fluidized bed;
   (d) recovering a mixture comprising paticulate glass fibers and sand from the upper portion of said bed;
   (e) introducing the mixture into separation means to produce substantially clean particulate fibers and a recycle sand stream;
   (f) introducing said substantially clean particulate fibers into a glass melting furnace;
   (g) combining said recycle sand stream with a fresh sand stream and introducing the combined stream into said bed;
   (h) recovering a hot gas and sand stream from the upper portion of said fluidized bed; and,
   (i) combining said hot gas stream with a hot oxidizing gas and introducing the combined stream into said fluidized bed.

2. The method of claim 1 in which said substantially clean particulate fibers are reduced in size prior to introduction into said furnace.

3. The method of claim 2 in which said substantially clean particulate fibers are introduced into a batch plant prior to introduction into said furnace.

4. The method of claim 3 in which said scrap glass fibers are introduced into said bed at in an amount of about 2 weight percent of said bed.

5. The method of claim 4 in which the fluidized bed has a fluidized depth of about 8 inches and said bed comprises sand of 500 to 900 micron particle size.

6. The method of claim 5 in which the static pressure across the bed is 11 to 14 inches water column and the velocity of said combined stream is about 110 feet per minute.

7. The method of claim 6 in which the scrap glass is reduced from a loss on ignition of about 15 percent to about 0.50 percent.

8. The method of claim 7 in which said coating is cracked to lower molecular weight substances.

9. The method of claim 8 in which said fluidized bed comprises catalysts which facilitate the removal of said coating.

10. The method of claim 9 in which the recovered hot gas stream has an oxygen content of about 15 volume percent.

* * * * *